(12) United States Patent
Glasspoole et al.

(10) Patent No.: US 6,183,193 B1
(45) Date of Patent: Feb. 6, 2001

(54) CAST ON-BOARD INJECTION NOZZLE WITH ADJUSTABLE FLOW AREA

(75) Inventors: David Frederick Glasspoole, St. Lambert; Yvan Schraenen, Mont St. Hilaire, both of (CA)

(73) Assignee: Pratt & Whitney Canada Corp., Longueuil (CA)

(*) Notice: Under 35 U.S.C. 154(b), the term of this patent shall be extended for 0 days.

(21) Appl. No.: 09/315,957

(22) Filed: May 21, 1999

(51) Int. Cl.⁷ ............................................. F01D 5/14
(52) U.S. Cl. .................................. 415/115; 416/95
(58) Field of Search ........................... 415/115, 116, 415/117; 416/95, 96 R, 96 A, 97 R; 60/39.75; 29/889.2, 407.05

(56) References Cited

U.S. PATENT DOCUMENTS

| | | | |
|---|---|---|---|
| 3,663,118 | * | 5/1972 | Johnson ............................... 415/116 |
| 3,832,090 | * | 8/1974 | Matto .................................... 416/95 |
| 4,092,768 | * | 6/1978 | Browning et al. .................. 29/156.8 |
| 4,435,123 | | 3/1984 | Levine . |
| 4,469,470 | | 9/1984 | Geary . |
| 4,526,511 | | 7/1985 | Levine . |
| 4,674,955 | * | 6/1987 | Howe et al. ............................ 416/95 |
| 4,708,588 | | 11/1987 | Schwarz et al. . |
| 4,730,978 | | 3/1988 | Baran, Jr. . |
| 4,822,244 | | 4/1989 | Maier et al. . |
| 4,882,902 | * | 11/1989 | Reigel et al. ........................ 60/39.75 |
| 5,215,435 | | 6/1993 | Webb et al. . |
| 5,245,821 | | 9/1993 | Thomas, Jr. et al. . |
| 5,875,549 | * | 3/1999 | McKinley ............................ 29/889.2 |
| 5,996,331 | * | 12/1999 | Palmer ................................. 415/115 |

* cited by examiner

Primary Examiner—Edward K. Look
Assistant Examiner—Hermes Rodriguez
(74) Attorney, Agent, or Firm—Jeffrey W. Astle

(57) ABSTRACT

A Tangential On-Board Injection (TOBI) nozzle or a Radial On-Board Injection (ROBI) nozzle with adjustable flow area in a gas turbine engine for directing a cooling air flow into a rotor assembly of the turbine is disclosed. The TOBI or ROBI nozzle is a unitary cast structure including a plurality of tangentially angled cooling air passages, a number of the passages being cast-closed. After a flow test is conducted using the TOBI or ROBI nozzle, one or more of the cast-closed passages may be selectively machined open if the mass flow of the TOBI or ROBI nozzle does not satisfy the design point. Therefore, the structure of the TOBI or ROBI nozzle is easily fabricated using a casting process with low manufacturing costs while the optimum cooling air flow is achieved by adjusting the total flow area of the TOBI or ROBI nozzle before it is installed to the gas turbine engine. Furthermore, the TOBI or ROBI nozzle is advantageously supported in a cantilevered manner to avoid the thermal stress caused by temperature differential. The adjustable flow area feature also enables the TOBI or ROBI nozzle to be broadly used in different types of engines, the required mass flow of which are various.

18 Claims, 3 Drawing Sheets

CAST ON-BOARD INJECTION NOZZLE WITH ADJUSTABLE FLOW AREA

TECHNICAL FIELD

This invention relates to gas turbine engines and, in particular, to the Tangential On-Board Injection (TOBI) and Radial On-Board Injection (ROBI) nozzle that provides cooling air flow for turbine blades.

BACKGROUND OF THE INVENTION

In gas turbine engines, fuel is burned within a combustion chamber to produce hot gases of combustion. The gases are expanded within a turbine section producing a gas stream across alternating rows of stationary stator vanes and turbine rotor blades to produce usable power. Gas stream temperatures at the initial rows of vanes and blades commonly exceed 2,000° F. Blades and vanes, susceptible to damage by the hot gas stream, are cooled by air compressed upstream within the engine and flowed to the turbine components.

One substantial problem associated with such systems is the transfer of cooling air from stationary cavities within the engine stator to a rotor assembly for subsequent distribution to the interior of the rotor blades. For this purpose, the TOBI nozzle is a well-known device. In particular, an inlet of the TOBI nozzle receives compressed air emanating from the compressor and passes the cooling air through annually spaced passages that impart a swirling movement and directs the discharging stream of cooling air tangentially to the rotating turbine assembly.

The volume and direction of the cooling air are features of the effectiveness of its cooling capacity and its effect to the overall engine performance. It is important that only the correct amount of cooling air be utilized as any additional air could penalize efficiency of combustion while too little air would result in overheating of the turbine blades. Hence, ideally the TOBI nozzle will optimize the use of turbine cooling air.

A TOBI nozzle with adjustable air flow is disclosed in U.S. Pat. No. 4,708,588 entitled TURBINE COOLING AIR SUPPLY SYSTEM, issued to Schwarz et al on Nov. 24, 1987. According to this patent, the amount of cooling air flowable to the turbine blades of a gas turbine engine is made variable in response to the blade requirements by enabling the opening and closing of a portion of injectors of a tangential on-board injection system supplying cooling air to the turbine rotor assembly. Actuator means are provided to rotate an annular ring such that the orifices in the ring align with a number of injectors at conditions of maximum cooling flow requirements, and are in misalignment at conditions requiring a lesser air flow. The turbine cooling air supply system disclosed in this patent requires additional material weight for the annular ring and the actuator means, which are critical and sensitive to a gas turbine engine, particularly used in aircrafts. The control system for a dynamic air flow adjustment increases problems associated with operation stabilities. Overall, the manufacturing cost will increase significantly for such a dynamic adjustable system.

Decreasing the manufacturing costs is another concern. For this purpose, a simple structure for low cost fabrication is desirable. For example, U.S. Pat. No. 4,435,123, entitled COOLING SYSTEM FOR TURBINES issued to Levine on Jul. 2, 1985, discloses a TOBI nozzle fabricated as a unitary structure that is formed by investment casting and may be easily secured in position in the engine. However, the problem encountered with a unitary investment-cast TOBI nozzle is that the temperature differential encountered in proximity to the attachment structure adjacent the turbine stator vanes is more severe than the structural integrity of the casting can tolerate. To utilize the unitary unit, the attachment end of the unit would need to be made of a different material from the investment cast material so that it could tolerate the temperature stress limitations. Obviously, this would require a weldment of the TOBI nozzle which is not only expensive and difficult but it presents problems that should otherwise be avoided.

U.S. Pat. No. 4,526,511 entitled ATTACHMENT FOR TOBI, issued to Levine on Jul. 2, 1985, discloses an improved unitary structure using attachment means which are a shielding ring. The shielding ring is segmented into several pads, circumferentially spaced to permit thermal growth. This ring serves to shield the mounting flange from the high temperature air.

SUMMARY OF THE INVENTION

An object of the invention is to provide a TOBI nozzle with an air flow area that can be adjusted before the TOBI nozzle is installed for operation.

Another object of the invention is to provide a unitary structure of a TOBI nozzle that may be easily secured in position in a gas turbine engine.

A further object of the invention is to provide a TOBI nozzle that is supported by a stator assembly of a gas turbine engine in a cantilevered manner so that the TOBI nozzle is not subjected to thermal stresses caused by temperature differentials and thrust loads.

According to the present invention, a cooling structure adapted to be fixed to a stator assembly of a gas turbine engine between a source of cooling air and a rotor assembly of the engine for directing cooling air flow in a direction of rotation of the rotor assembly and further into the rotor assembly, comprises an annular body including radially spaced-apart outer and inner peripheries, a plurality of cooling air passages that are circumferentially spaced apart, and that are inwardly oriented in the direction of rotation of the rotor assembly for directing the cooling air flow, at least one but not all of the cooling air passages being left closed when the cooling structure is fabricated and the cooling air passages left closed being adapted to be selectively machined open to satisfy an air mass flow requirement determined after the cooling structure is fabricated.

Preferably, the cooling air structure further has an annular upstream wall and an annular downstream wall wherein the annular upstream wall extends outwardly to form a bell mouth that provides a smooth transition for the cooling air flow, and the annular upstream wall is mounted at an end of the bell mouth to the stator assembly to provide a cantilevered support for the cooling structure.

The cooling structure is preferably an integral single unit fabricated using a casting process.

In general terms, a TOBI nozzle according to one aspect of the invention comprises a plurality of passages for the intake of cooling air. The TOBI nozzle is fabricated such that a number of the passages are left closed. Before the TOBI nozzle is installed in the gas turbine engine for operation, one or more of the left closed passages may be selectively machined open, which depends on whether a cooling air mass flow enabled thereby does not satisfy a predetermined mass flow requirement. The cooling air mass flow enabled by the fabricated TOBI nozzle may be determined by a cooling air flow test. A ROBI nozzle could also be fabricated in a similar fashion.

This invention also provides a method for optimizing cooling air flow through a TOBI or ROBI nozzle for delivering cooling air to a turbine rotor assembly in a gas turbine engine, comprising: fabricating the TOBI or ROBI nozzle with a plurality of passages for intake of cooling air, the TOBI or ROBI nozzle being fabricated such that a number of the passages are left closed; determining cooling air mass flow requirements for the rotor assembly of a particular gas turbine engine; and selectively machining open one or more of the left closed passages as a result of the cooling air mass flow determination in the previous step.

The performance of the gas turbine engines is improved when the TOBI nozzle with adjustable flow area to optimize cooling air flow therethrough is used. The unitary structure of the TOBI or ROBI nozzle according to the invention can be easily fabricated using the casting process with low manufacturing cost, and is advantageously not subjected to thermal stress caused by temperature differentials. The adjustable flow area feature also enables the TOBI nozzle to be broadly applicable in different types of engines which have various cooling air mass flow requirements.

BRIEF DESCRIPTION OF THE DRAWINGS

The invention will be better understood from the following description of a preferred embodiment as an example only, in conjunction with reference to the accompanying drawings, in which.

DETAILED DESCRIPTION OF THE PREFERRED EMBODIMENT

Figure 1:
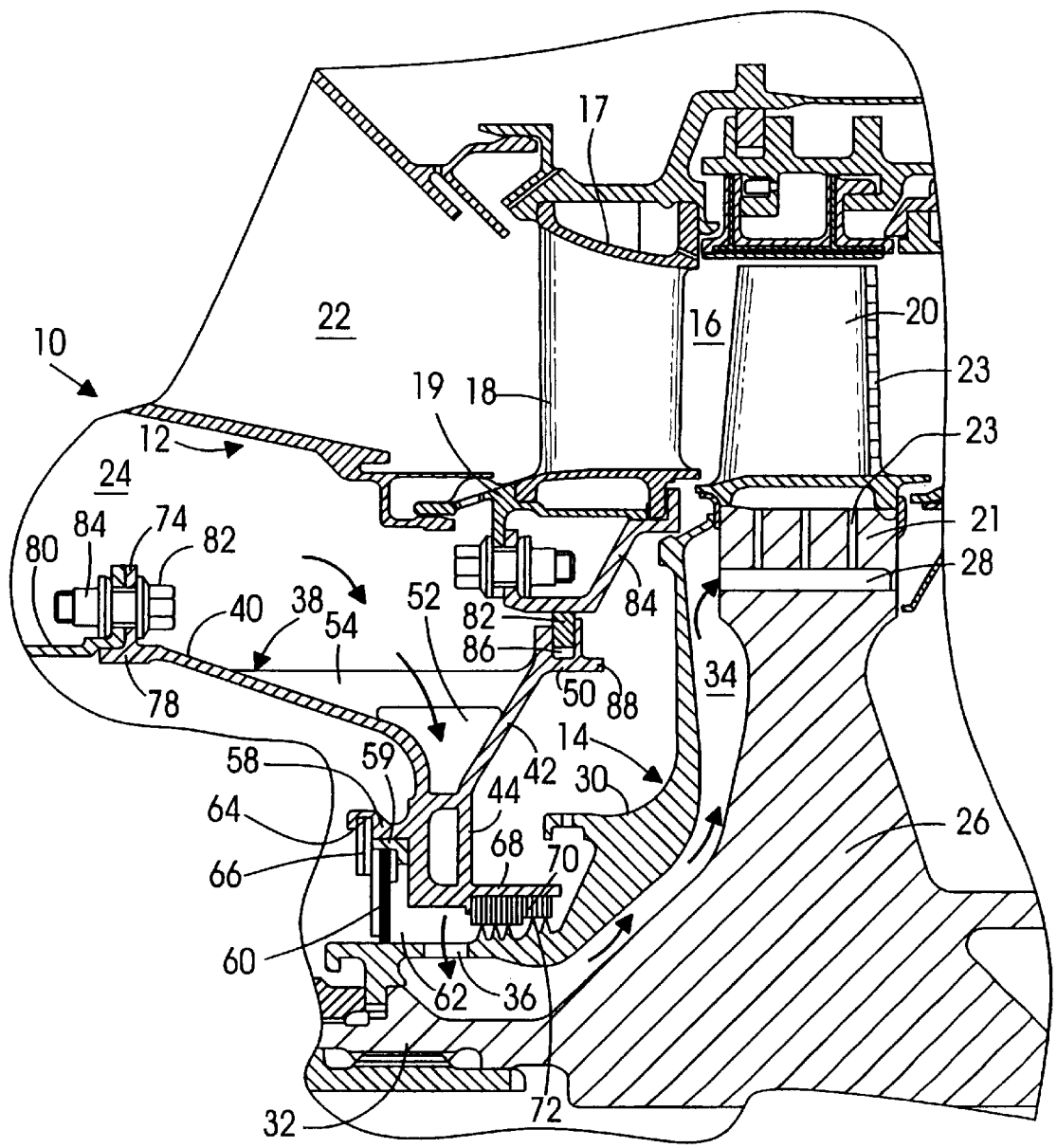
FIG. 1 is a fragmentary axial cross section of a portion of the turbine section of a gas turbine engine showing a TOBI nozzle for the distribution of cooling air to the turbine blades.

A simplified portion 10 of the turbine section of a gas turbine engine is shown in FIG. 1. Included within the portion shown is a stator assembly 12 and a rotor assembly 14. A flow path 16 for the hot gases is provided downstream of a combustion chamber 22 and defined by the stator assembly 12 including an annular outer flow path wall 17 and an annular inner flow path wall 19. The flow path 16 extends axially between alternating rows of stator vanes, as represented by the single vane 18, and rows of rotor blades, as represented by the single blade 20.

An annular cavity 24 is formed within the stator assembly 12 and it functions in part as a reservoir for turbine cooling air.

Immediately downstream of the row of stator vanes 18 is disposed the row of rotor blades 20. The rotor blades 20 extend radially outwardly from a supporting rotor disk 26 via respective rotor blade roots 21 which are mounted in the supporting rotor disk 26. The supporting rotor disk 26 includes a plurality of inlets 28, each communicating with internal passages 23 of the root 21 and the blade 20, only part of the passages 23 and their surface apertures of the blade 20 being shown, through which cooling air is flowable to cool the blade 20. A rotor cover 30 is mounted upstream of the rotor disk 26 to rotate with it. The rotor cover 30 is mounted on an upstream extending, cylindrical portion 32 of the rotor disk 26 and the outer periphery of the cover 30 is forced by a centrifugal force to abut the rotor disk 26 as the rotor assembly 14 rotates so that an annular and radial passage 34 is formed between the rotor disk 26 and the rotor cover 30. A plurality of apertures 36 is provided through the rotor cover 30 to form an inlet of the annular radial passage 34 for the intake of cooling air that flows through the passage 34 into the inlets 28 to cool the rotor blades 20. This is not a part of the present invention and will not be described in any greater detail.

A cooling structure of the invention is in the form of a Tangential On-Board Injection (TOBI) nozzle 38 which includes an annular upstream wall 40, annular downstream wall 42 and an annular body 44 interconnecting the upstream and downstream walls. A plurality of circumferentially spaced-apart passages 46, as illustrated in FIGS. 2 and 3, oriented in a tangential angle towards the direction of rotation, as indicated by arrow R, are provided through the annular body 44 to inject the cooling air from the chamber 24 into the annular and radial passage 34.

Figure 2:
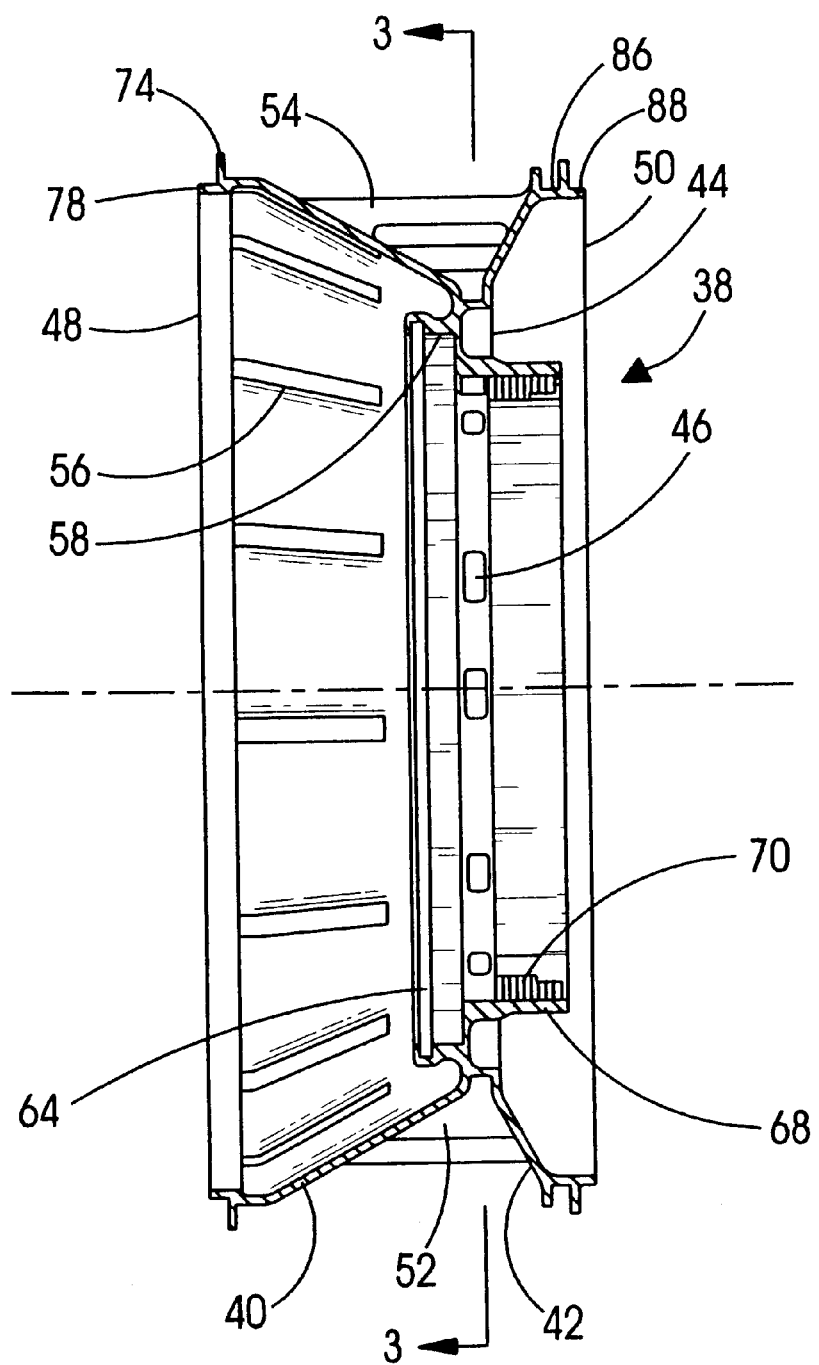
FIG. 2 is an axial cross-sectional view of the embodiment of FIG. 1.
Figure 3:
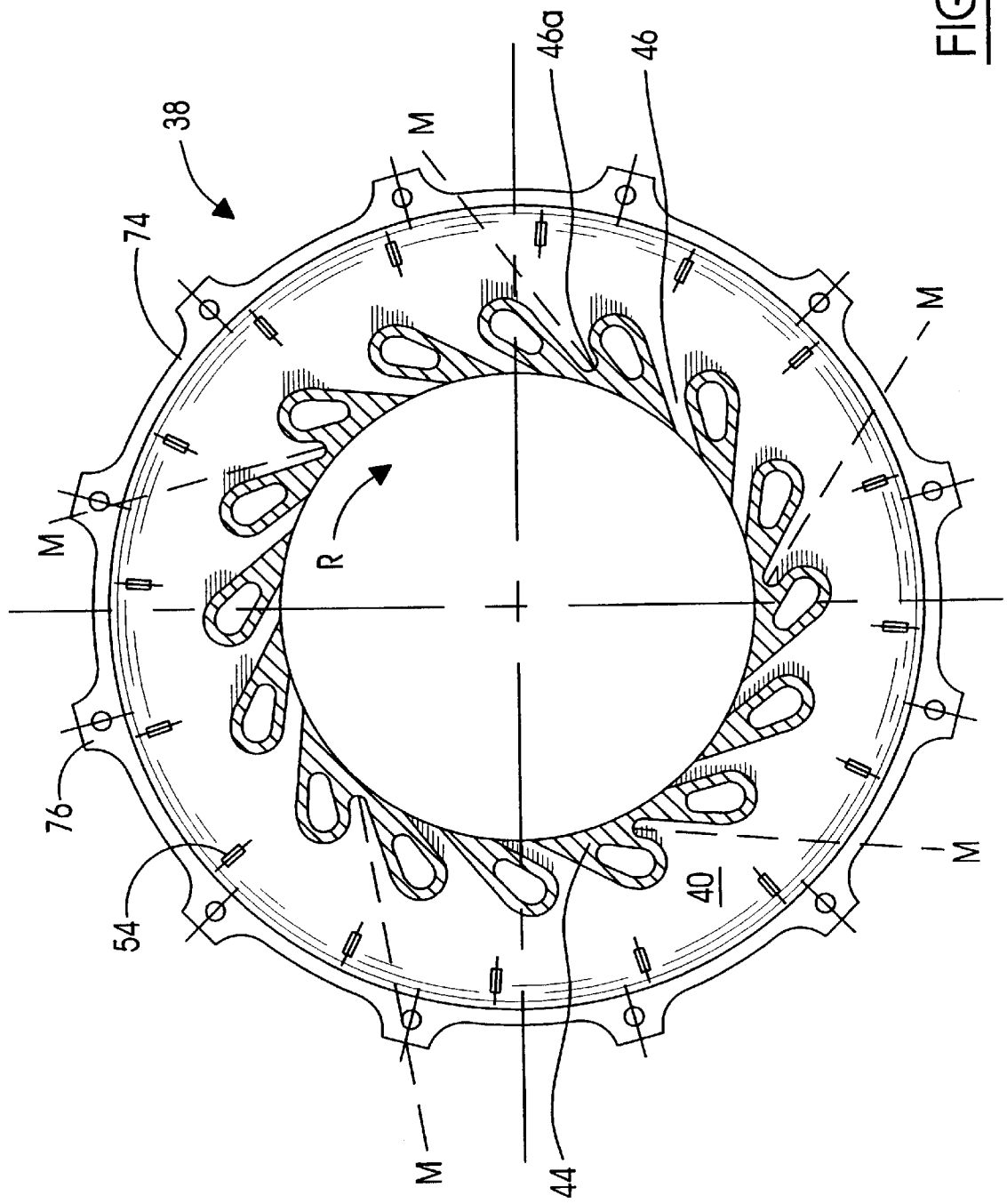
FIG. 3 is a radial cross-sectional view taken along line 3—3, as shown in FIG. 2.

The TOBI nozzle 38 is illustrated in FIGS. 2 and 3 with more structural details. The TOBI nozzle 38 is a unitary cast unit. The annular upstream wall 40 extends outwardly from the annular body 44 and smoothly bends from a radial direction to an axial direction to form a bell mouth 48 that provides a smooth transition for the cooling air flow along the surface of the annular upstream wall 40. The annular downstream wall 42 extends from the annular body 44 outwardly to form another bell mouth 50 towards the opposite direction and, therefore, an annular cavity 52 is formed between the upstream and downstream walls, surrounding the annular body 44 as an annular inlet of the TOBI nozzle. A plurality of circumferentially spaced-apart stiffening ribs 54 extend axially and interconnect the upstream and downstream walls 40, 42 to improve a dynamic stability of the TOBI nozzle 38 which must tolerate the high velocity of the cooling air flow. Another group of circumferentially spaced-apart stiffening ribs 56 radially and axially extend along and protrude from the upstream side of the upstream wall 40 to increase the strength and stability of the upstream wall 40. The annular body 44 is a thin-walled frame structure which is necessary not only for decreasing the weight of the structure but also for evenly distributing the melting metal material during the casting process, to ensure the casting quality of the TOBI nozzle.

The number of passages 46 in this preferred embodiment is sixteen and may be varied in other applications for different engines. The passages 46 are formed in the thin-walled frame body structure. The tangential angle of the passages 46 towards the direction R of rotation of the rotor assembly 14 is shown in FIG. 3. During the casting process, eleven of the sixteen passages 46 are fabricated open and the remaining five passages are fabricated closed, indicated as 46a in FIG. 3. A required flow area of the passages is derived from the mass flow requirements to feed the rotor blades 20 plus the leakage from the seals between the TOBI nozzle 38 and the rotor assembly 14, which will be further disclosed below. The required flow area of the passages must meet the design point. The nominal flow area of the eleven open passages is designed to meet the designed point. A cast surface roughness in microns is counted for in the design. However, the cast surface roughness and the limited accuracy of the casting process usually causes a flow loss. The present embodiment was designed to account for casting surface roughness. A flow test should be conducted using the TOBI nozzle 38 in a testing equipment after the TOBI nozzle 38 is cast and mounting and sealing surfaces thereof, which will be described below, are machined. If the flow does not meet mass flow requirements, one or more of the remaining five cast-closed passages 46a may selectively be machined open to the predetermined area until the required flow is achieved.

Each of the cast-closed passages 46a is designed so that the opening of either one thereof will not exceed a total flow tolerance range for cooling air flowing through TOBI nozzle 38. The mass flow of the cooling air through the TOBI nozzle 38 is computed prior to machining open one or more cast-closed passages 46a to ensure that a predetermined flow tolerance is not exceeded by machining open the one or more passages. It is suggested that every single unit of a group of the TOBI nozzles 38, which are designed for the same type of engines, should be flow-tested because the limited accuracy of the casting process causes variations of the actual flow area. If a group of the TOBI nozzle is intended to be used for more than one type of gas turbine engines, the nominal flow area of the cast-open passages should be designed to meet the design point of one type of the engines which have least mass flow requirements. After the flow test is conducted, one or more of the cast-closed passages may be machined open to reach a mass flow requirement for another type of engine.

In order to adjust the flow area after the flow test is conducted, a drilling machine must have access to the predetermined position of the cast-closed passages 46a. It is important during the design stage to place the stiffening ribs 54 in appropriate circumferential positions so that the stiffening ribs 54 do not block or interfere with the access to machine open the cast-closed passages 46a. The access is illustrated by the broken lines M in FIG. 3.

The annular body 44 includes an annular upstream seat 58 for receiving an annular spacer 59 to hold a brush seal 60, shown in FIG. 1, which operatively seals at the upstream side, an annular chamber 62 between the rotating rotor cover 30 and the stationary TOBI nozzle 38. The annular seat 58 further includes at its upstream side, an annular groove 64 in which a spring ring 66 is engaged to hold the brush seal 60 in position. At the downstream side, the annular body 44 includes an annular downstream seat 68. A honeycomb seal 70 is brazed to an inner surface of the annular downstream seat 68. In co-operation with a labyrinth seal 72 that is on the rotor cover 30 and rotates with it, the honeycomb seal 68 seals, at the downstream side, the annular chamber 62. The cooling air which flows from the cavity 24 into the cavity 52 of the TOBI nozzle 38 and is then injected from the passages 46, enters the annular chamber 62, and further flows into the annular and radial passage 34 through the aperture 36, indicated by the arrows in FIG. 1.

An end 74 of the bell mouth 48, as shown in FIG. 2, extends outwardly and radially to form a mounting surface and includes a plurality of circumferentially spaced-apart mounting ears 76, as shown in FIG. 3, for receiving mounting bolts. An annular ring 78 extends axially from the end 74 of the bell mouth to form an annular protruding ridge which is received within an annular bearing housing 80, partially shown in FIG. 1, to position the TOBI nozzle 38. A set of bolts and nuts 82, 84 is used to connect the end 74 of the bell mouth 48 and a mounting surface of the annular bearing housing 80.

The TOBI nozzle 38 is secured to the stator assembly 12 only at the upstream side with the bell mouth end 74 bolted to the annular bearing housing 80. Therefore, the TOBI nozzle 38 is supported in a cantilevered manner and the downstream end thereof is not restricted either radially or axially. Such that, the TOBI nozzle 38 is not affected by thermal stress that would be caused by temperature differential if both upstream and downstream ends thereof were secured to the stator assembly 12.

A piston ring 82 is provided between the outer periphery of the bell mouth 50 of the annular downstream wall 42 and an annular seat 84 that is mounted to the stator assembly 12. The piston ring 82 is received in an annular groove 86 which extends radially from the outer periphery of the bell mouth 50. An external surface of the piston ring 82 abuts an inner surface of the annular seat 84 to form a seal at the downstream end of the annular cavity 24. The piston ring 82, however, permits radial and axial displacement of the end 88 of the bell mouth 50 relative to the annular seat 84.

Changes and modifications to the embodiment herein before described can be made without departing from the scope of the invention which is intended solely by the scope of the appended claims.

We claim:

1. A cooling structure adapted to be fixed to a stator assembly of a gas turbine engine between a source of cooling air and a rotor assembly of the engine for directing cooling air flow in a direction of rotation of the rotor assembly and further into the rotor assembly, comprising:

an annular body including radially spaced-apart outer and inner peripheries, a plurality of cooling air passages that are circumferentially spaced apart and that are inwardly oriented in the direction of rotation of the rotor assembly for directing the cooling air flow, at least one but not all of the passages being left sealed when the cooling structure is fabricated and the cooling air passages left sealed being adapted to be selectively machined open to satisfy an air mass flow requirement determined after the cooling structure is fabricated.

2. The cooling structure as claimed in claim 1, wherein the annular body is formed by a single casting unit; the cooling air passages extend between the outer and inner peripheries; and each of the left sealed passages includes a cast wall portion at the inner periphery.

3. The cooling structure as claimed in claim 1, further having an annular upstream wall and an annular downstream wall wherein the annular upstream wall extends outwardly to form a bell mouth that provides a smooth transition for the cooling air flow, and the annular upstream wall is mounted at an end of the bell mouth to the stator assembly to provide a cantilevered support for the cooling structure.

4. The cooling structure as claimed in claim 3, wherein an outer periphery of the annular downstream wall is axially and radially displaceable with respect to the stator assembly.

5. The cooling structure as claimed in claim 1, wherein sealing mechanisms are provided between the annular body and the rotor assembly to minimize cooling air leakage.

6. The cooling structure as claimed in claim 4, wherein a sealing mechanism is provided between the outer periphery of the annular downstream wall and the stator assembly to minimize cooling air leakage.

7. The cooling structure as claimed in claim 3, wherein a plurality of circumferentially spaced-apart stiffening ribs interconnect the annular upstream and downstream walls, and are positioned so that the passages left sealed are accessible to be selectively machined open.

8. The cooling structure as claimed in claim 3, wherein an annular ring extends from the end of the bell mouth to form an annular protruding ridge which is adapted to be received within an annular bearing housing to position the cooling structure.

9. The cooling structure as claimed in claim 3, wherein the end of the bell mouth includes a plurality of mounting ears which are circumferentially spaced-apart from each other.

10. The cooling structure as claimed in claim 6, wherein the outer periphery of the annular downstream wall comprises an annular groove for receiving a piston ring seal.

11. The cooling structure as claimed in claim 5, wherein the annular body comprises an annular upstream seat and an annular downstream seat for respectively accommodating the sealing mechanisms.

12. The cooling structure as claimed in claim 1, comprising an integral single unit fabricated using a casting process.

13. The cooling structure as claimed in claim 12, wherein the annular body is a thin-walled frame structure.

14. In a turbine section of a gas turbine engine having a combustor; a hot gas path downstream of the combustor defined by a stator assembly including an annular outer gas path wall and an annular inner gas path wall; a rotor assembly including a rotor disk and a plurality of radially extending turbine blades mounted to the rotor disk, the turbine blades extending across the gas path and each blade including cooling passages therein, the cooling passages extending through a root of the blade that is mounted in the rotor disk and communicating with an inlet in the rotor disk, for intake of cooling air; and a Tangential On-Board Injection (TOBI) nozzle mounted to the stator assembly between a source of cooling air and the rotor assembly for directing cooling air flow in a direction of the rotor assembly and further into the rotor assembly to cool the turbine blades, the TOBI nozzle comprising:

an annular body of an integrated single casting unit including radially spaced-apart outer and inner peripheries, a plurality of cooling air passages that are circumferentially spaced apart and that extend inwardly between the outer and inner peripheries and angularly oriented in the direction of rotation of the rotor assembly for directing the cooling air flow, at least one but not all of the passages being left sealed when the cooling structure is fabricated and the cooling air passages left sealed including cast wall portion respectively at the inner periphery and being adapted to be selectively machined open to satisfy an air mass flow requirement determined after the cooling structure is fabricated.

15. A method for optimizing cooling air flow through a Tangential On-Board Injection (TOBI) nozzle for delivering cooling air to a turbine rotor assembly in a gas turbine engine comprising:

fabricating the TOBI nozzle with a plurality of passages for intake of cooling air, the TOBI nozzle being fabricated such that a number of the passages are left closed;

determining cooling air mass flow requirements for the rotor assembly of a particular gas turbine engine; and selectively machining open one or more of the left closed passages as a result of the cooling air mass flow determination in the previous step.

16. A method as claimed in claim 15, wherein the cooling air mass flow requirements are a measure of the cooling air required to be fed into a plurality of rotational blades which are to be cooled by the cooling air and plus air leakage from the sealing mechanisms between the annular body and the rotor assembly.

17. A method as claimed in claim 15, including a step of designing the passages so that the opening of either one of the closed passages will not exceed a total flow tolerance range for cooling air flowing through the TOBI nozzle.

18. A method as claimed in claim 15, further including a step of computing a mass flow of the cooling air through the TOBI nozzle prior to machining open one or more of the closed passages to ensure that a predetermined flow tolerance is not exceeded by machining open the one or more of the passages.

* * * * *